United States Patent [19]

Huber et al.

[11] Patent Number: 6,070,173

[45] Date of Patent: May 30, 2000

[54] METHOD AND APPARATUS FOR ASSISTING GARBAGE COLLECTION PROCESS WITHIN A JAVA VIRTUAL MACHINE

[75] Inventors: Gary Douglas Huber; Donald William McCauley, both of Austin, Tex.

[73] Assignee: International Business Machines Corporation, Armonk, N.Y.

[21] Appl. No.: 08/979,595

[22] Filed: Nov. 26, 1997

[51] Int. Cl.[7] .................................................. G06F 17/30
[52] U.S. Cl. .............................. 707/206; 707/103; 711/2; 395/676
[58] Field of Search .................................. 707/206, 103; 395/676, 200; 709/106; 711/165, 202, 206, 165.2; 364/247, 254

[56] References Cited

U.S. PATENT DOCUMENTS

| | | | |
|---|---|---|---|
| 4,989,134 | 1/1991 | Shaw | 707/206 |
| 5,699,539 | 12/1997 | Garber et al. | 711/2 |
| 5,706,515 | 1/1998 | Connelly et al. | 395/676 |
| 5,845,298 | 12/1998 | O'Connor et al. | 707/206 |
| 5,848,423 | 12/1998 | Ebrahim et al. | 707/206 |
| 5,873,105 | 2/1999 | Tremblay et al. | 707/206 |

*Primary Examiner*—Ruay Lian Ho
*Assistant Examiner*—Thu-Thao Havan
*Attorney, Agent, or Firm*—Casimer K. Salys; Antony P. Ng; Andrew J. Dillon

[57] ABSTRACT

A method and apparatus for assisting garbage collection process within a Java virtual machine are disclosed. A virtual object heap and a physical object heap are provided within the Java virtual machine, with the virtual object heap considerably larger than the physical object heap. Objects from Java applications are allocated within the virtual object heap. Each address of the allocated objects within the virtual object heap is translated into an address of a location within the physical object heap. Garbage collection is performed in the virtual object heap only when a total number of objects within the virtual object heap has reached a predetermined threshold.

6 Claims, 4 Drawing Sheets

METHOD AND APPARATUS FOR ASSISTING GARBAGE COLLECTION PROCESS WITHIN A JAVA VIRTUAL MACHINE

BACKGROUND OF THE INVENTION

1. Technical Field

The present invention relates to a method and apparatus for data processing in general, and in particular to a method and apparatus for assisting garbage collection within a data-processing system. Still more particularly, the present invention relates to a method and apparatus for assisting a garbage collection process within a Java virtual machine.

2. Description of the Prior Art

Like most object-oriented applications, a Java application typically allocates new objects to a region of a system memory within a data-processing system commonly referred to as a "heap." During execution, the Java application relies on a garbage collection process to reclaim space within the heap that is no longer utilized by previously allocated objects. The garbage collection process is typically invoked whenever the Java application attempts to create a new object but there is insufficient free space available within the heap to satisfy such object allocation.

In an uniprocessor Java virtual machine, a "synchronous" garbage collection process is typically employed for performing the task of heap space reclamation. Generally, the synchronous garbage collection process begins its operations by temporarily stopping all Java application(s) within the Java virtual machine. Next, the synchronous garbage collection process traverses a Java stack and the heap in order to search for all active objects and their "children." These active objects and their "children" are then marked accordingly. Afterwards, the heap is searched again for a second time to reclaim (or free) any space previously utilized by unmarked (or dead) objects. At times, the synchronous garbage collection process may even compact all live objects within the heap to eliminate fragmentation. Finally, the Java application(s) is/are restarted again.

Conservatively speaking, a typical synchronous garbage collection process may delay Java application(s) for periods of up to several hundred milliseconds and may even attribute up to 5 to 25% of the total runtime of these Java application (s). While existing software implementations of concurrent garbage collection processes may help in reducing the length of the delay time, they cannot reduce the actual time spent on garbage collection; and in fact, they may even increase the total runtime of the Java application(s).

In addition, garbage collection processes are intrinsically complicated because most objects allocated by Java applications have non-uniform size and variable life-times such that multiple garbage collection algorithms are typically required to tackle various heap space reclamation problems. As a result, garbage collection processes are constantly consuming a significant percentage of the total runtime of Java applications. Thus, it would be desirable to provide an improved method and apparatus for assisting garbage collection processes within a Java virtual machine.

SUMMARY OF THE INVENTION

In view of the foregoing, it is therefore an object of the present invention to provide an improved method and apparatus for data processing.

It is another object of the present invention to provide an improved method and apparatus for assisting garbage collection within a data-processing system.

It is yet another object of the present invention to provide an improved method and apparatus for assisting a garbage collection process within a Java virtual machine.

In accordance with a preferred embodiment of the present invention, a virtual object heap and a physical object heap are provided within a Java virtual machine, with the virtual object heap considerably larger than the physical object heap. Objects from Java applications are allocated within the virtual object heap. Each address of the allocated objects within the virtual object heap is translated into an address of a location within the physical object heap. Garbage collection is performed in the virtual object heap only when a total number of objects within the virtual object heap has reached a predetermined threshold.

All objects, features, and advantages of the present invention will become apparent in the following detailed written description.

BRIEF DESCRIPTION OF THE DRAWINGS

The invention itself, as well as a preferred mode of use, further objectives, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be executed in a variety of data-processing systems under a number of different operating systems. These data-processing systems are typically, but not required to be, part of a network such as a local-area network (LAN) or a wide-area network (WAN).

Figure 1:
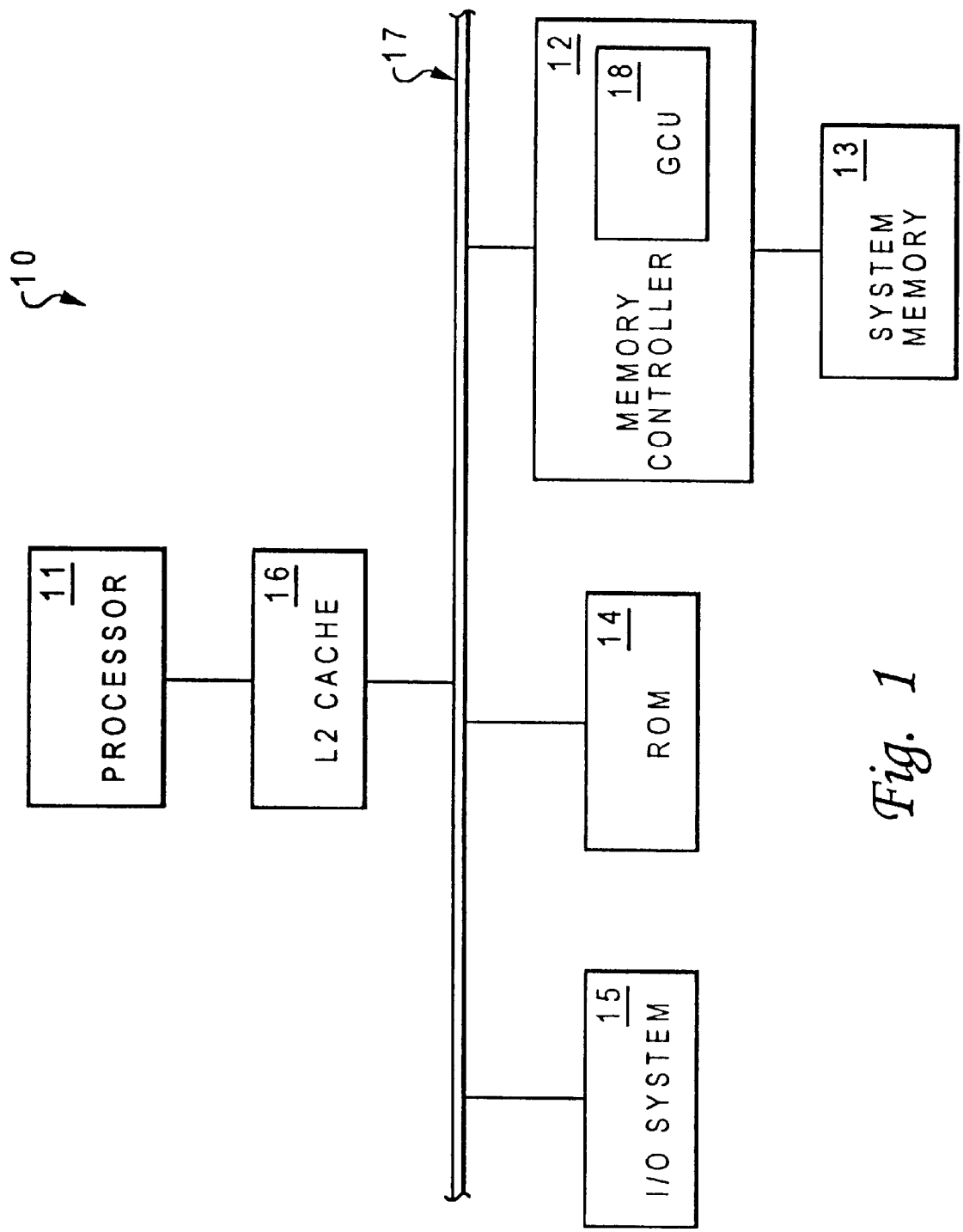
FIG. 1 is a block diagram of a data-processing system in which a preferred embodiment of the present invention is applicable.

Referring now to the drawings and in particular to FIG. 1, there is depicted a block diagram of a data-processing system 10 in which a preferred embodiment of the present invention is applicable. Data-processing system 10 comprises a processor 11, a memory controller 12, a system memory 13, a read-only memory (ROM) 14, and an I/O subsystem 15. As shown, processor 11 is coupled to memory controller 12 via a system bus 17. With the assistance of a garbage collection unit (GCU) 18, memory controller 12 provides memory management to system memory 13. In addition, an optional secondary L2 cache 16 may be coupled to processor 11 which typically includes an on-board primary L1 cache.

During operation, a copy of Java virtual machine software is preferably executing along with an operating system within data-processing system 10. For the purpose of illustrating the present invention, data-processing system 10 may be viewed as a Java virtual machine as is well-known in the art.

Figure 2:
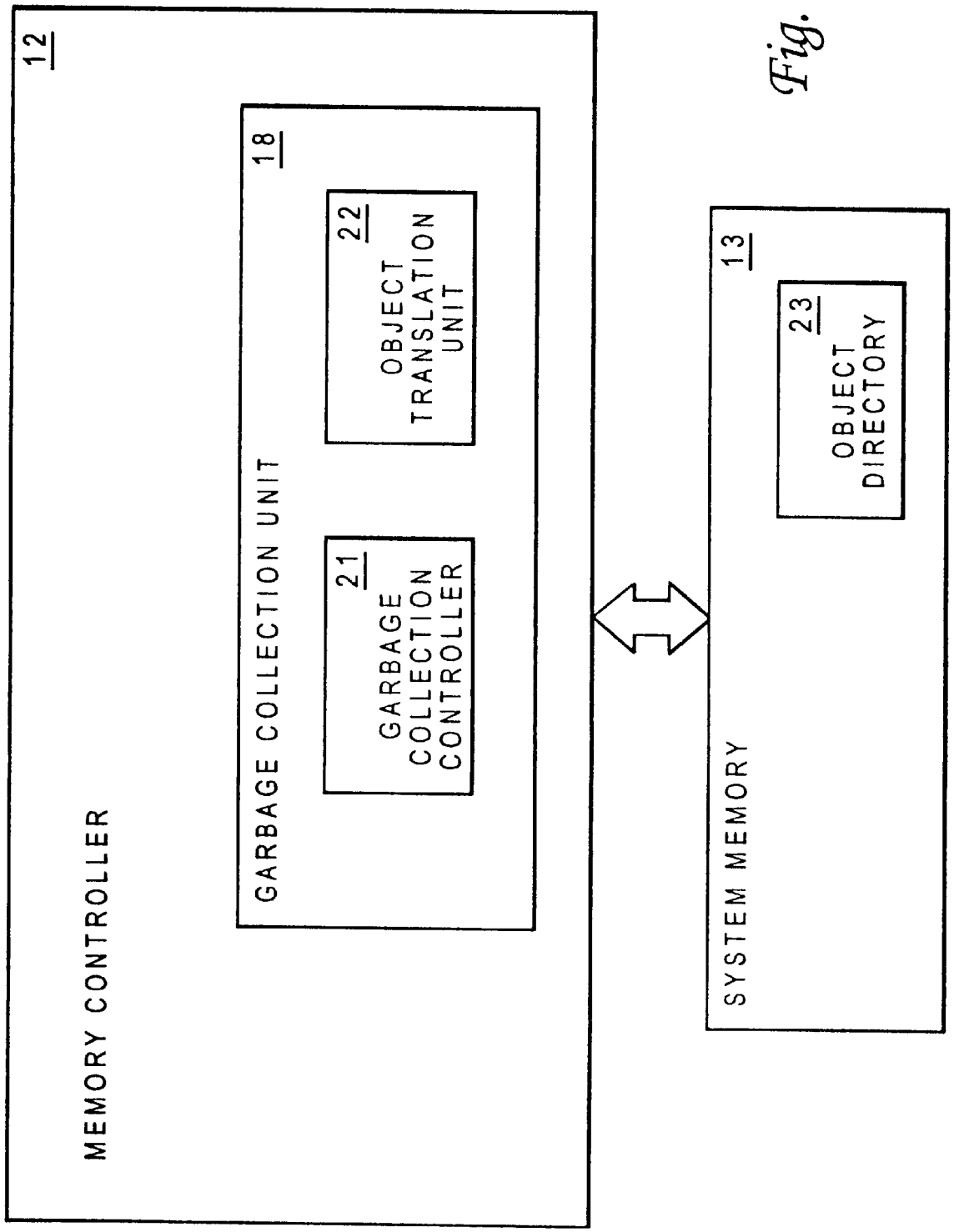
FIG. 2 is a block diagram of a garbage collection unit in accordance with a preferred embodiment of the present invention.

With reference now to FIG. 2, there is illustrated a block diagram of a garbage collection unit in accordance with a preferred embodiment of the present invention. Garbage collection unit (GCU) 18 includes a garbage collection controller 21 and an object translation unit 22. While both garbage collection controller 21 and object translation unit 22 are preferably implemented within memory controller 12, other implementations are also permissible.

Garbage collection controller (GCC) 21 asynchronously searches for live objects in a stack and in a heap within the Java virtual machine. Preferably, both the stack (not shown) and the heap (not shown) are implemented within system memory 13. GCC 21 periodically scans the stack and the heap to identify all the active objects and reclaim spaces previously occupied by now dead objects. Various garbage collection algorithms can be utilized. GCC 21 also periodically synchronizes with the Java virtual machine to complete a single pass of garbage collection process and to define a new "root set" of active objects for a subsequent pass of garbage collection process. GCC 21 performs garbage collection while Java application(s) is/are being executed within processor 11. In addition, GCC 21 may perform concurrent copy and compaction of active objects if data-processing system 10 supports these options. If data-processing system 10 utilizes page translations, then GCC 21 needs access to all translation tables within data-processing system 10.

As a preferred embodiment of the present invention, a virtual object heap and a physical object heap are provided within data-processing system 10. The size of the virtual object heap is considerably larger than that of the physical object heap. For example, the size of a virtual object heap may be from at least three times to even 30 times the size of a physical object heap. Objects associated with Java applications are first allocated within the virtual object heap. Each address of the allocated objects within the virtual object heap is subsequently translated into an address of a location within the physical object heap. Together with an object directory 23, object translation unit 22 provides a dynamic mapping of allocated objects from the virtual object heap to available locations in the physical object heap that is preferably located within system memory 13. A garbage collection is performed in the virtual object heap only when a total number of allocated objects within the virtual object heap has reached a predetermined threshold.

Figure 3:
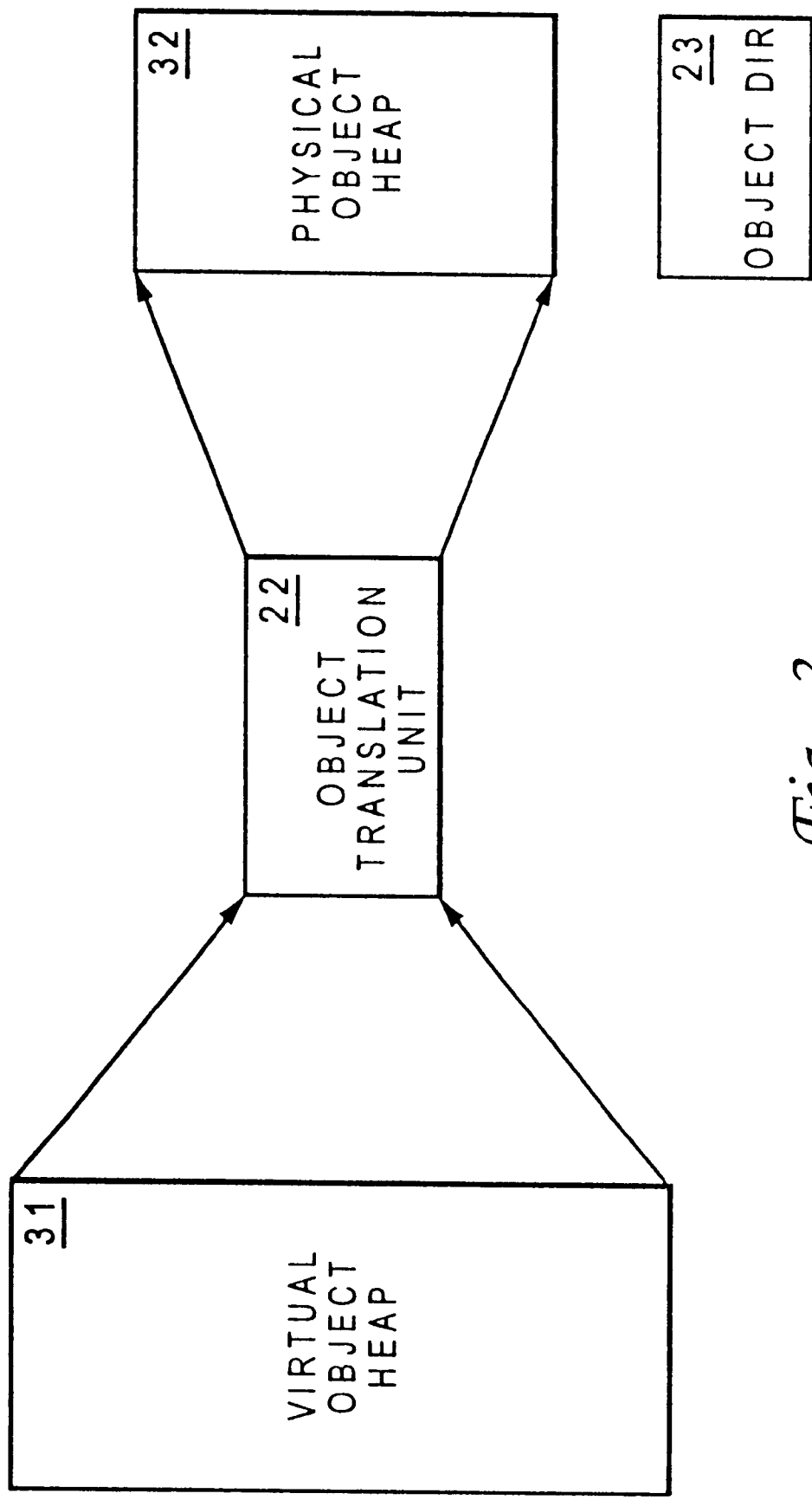
FIG. 3 is a conceptual view of a virtual object heap in relation to a physical object heap, for assisting garbage collection process, in accordance with a preferred embodiment of the present invention.

Referring now to FIG. 3, there is illustrated a conceptual view of a virtual object heap in relation to a physical object heap, for assisting garbage collection process, in accordance with a preferred embodiment of the present invention. As shown, a virtual object heap 31 is associated to a physical object heap 32 via object translation unit 22. The large address space within virtual object heap 31 is mapped into a much smaller address space within physical object heap 32 by object translation unit 22.

As mentioned previously, physical object heap 32 is a physical memory preferably implemented within a system memory such as system memory 13 of FIG. 2. Only a portion of the system memory is utilized as physical object heap 32. Depending on a specific implementation, if the size of the system memory is 64 MBytes, the size of physical object heap 32 should be in the range of approximately 16 to 32 MBytes. Programmable (or memory-mapped) registers within the garbage collection unit define a starting and an ending address of physical object heap 32 within the system memory.

On the other hand, virtual object heap 31 is a virtual memory that does not exist in a physical sense, but it can be viewed as a virtual memory space that resides within a data-processing system 10. The maximum size of virtual object heap 31 depends on the addressing scheme of the data-processing system. For a data-processing system having a 32-bit addressing scheme, the maximum size of virtual object heap 31 may be up to two GBytes, and the size of virtual object heap 31 is at least several times of that of physical object heap 32.

As a preferred embodiment of the present invention, each of virtual object heap 31 and physical object heap 32 are separately divided into multiple "object allocation units" for receiving objects created by Java applications (i.e., Java objects). Generally, these Java objects tend to be relatively small; for example, a typical Java object is 32 bytes or less, thus, an object allocation unit should also be small, such as 32 bytes or less. Each object allocation unit has an associated virtual address and an associated physical address. As their names imply, the virtual address corresponds to virtual object heap 31 and the physical address corresponds to physical object heap 32. Object translation unit 22 translates an object allocation unit's virtual address in virtual object heap 31 to a corresponding physical address in physical object heap 32. In other words, object translation unit 22 maps an address of each object allocation unit in virtual object heap 31 to a corresponding address in physical object heap 32. The translation addresses between virtual object heap 31 and physical object heap 32 for each object allocation unit are stored in object directory 23. In FIG. 2, object directory 23 is shown to be integrated within system memory 13; however object directory 23 can also be integrated within memory controller 12 or may remain physically distinct.

During execution, each Java object is transparently divided into one or more object allocation units. For example, large Java objects are transparently divided into smaller, uniformly-sized object allocation units to be placed within virtual object heap 31.

Typically, Java objects are neither uniform in size nor in lifetime. Large Java objects, though fewer in number than small Java objects, can occupy a significant portion of virtual object heap 31; and some Java objects, both large and small, persist far longer than others. Hence, even assuming Java objects are optimally placed in physical object heap 32 when being translated from virtual object heap 32, variations in size and lifetime can quickly fragmentize the system memory. Thus, the usage of small, uniformly-sized object allocation units in virtual object heap 31 and the ability to map any portion of an object to any available location in physical object heap 32 within the system memory helps maximize utilization and the re-usage of the system memory. In addition, several small objects can be packed into one object allocation unit to further improve utilization of the system memory.

Figure 4:
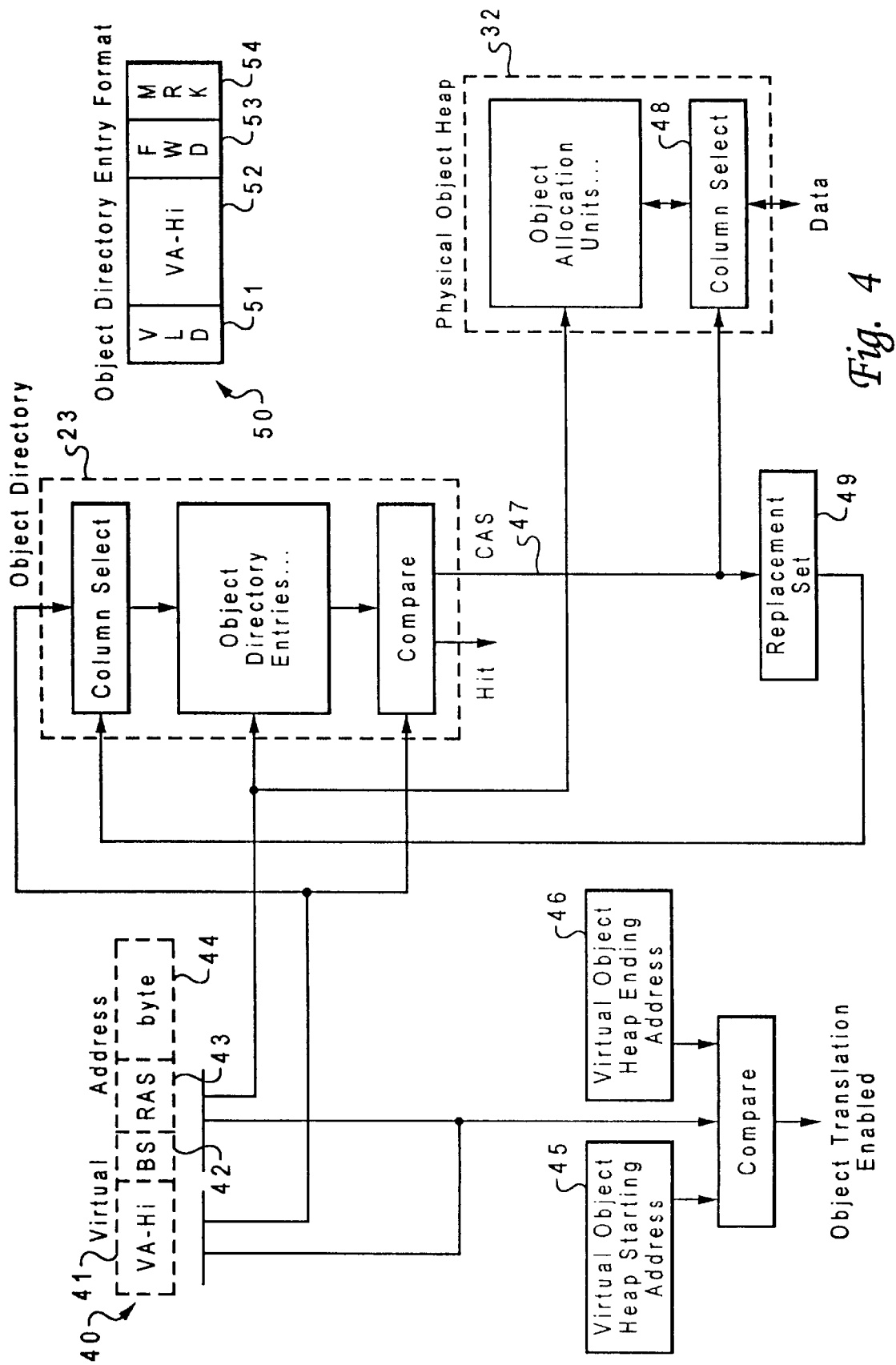
FIG. 4 is a block diagram of an object translation, in accordance with a preferred embodiment of the present invention.

With reference now to FIG. 4, there is depicted a block diagram of an object translation, in accordance with a preferred embodiment of the present invention. Object translation is a process for translating a virtual address of an object allocation unit in virtual object heap 31 to a corresponding physical address in physical object heap 32. A virtual object heap starting address (VHSA) and a virtual object heap ending address (VHEA) define the range of virtual addresses assigned by the Java virtual machine, within virtual object heap 31. All accesses by the processor to the system memory utilizing a virtual address that is greater than (or equal to) VHSA while less than (or equal to) VHEA are subject to object translation.

In a preferred embodiment, the size of physical object heap 32 is specified during the initialization of the Java virtual machine. As mentioned previously, the size of virtual object heap 31 is preferably at least several times that of physical object heap 32. In addition, physical object heap 32 is typically placed at the top of the system memory and the starting and ending addresses are initialized appropriately. For a data-processing system having 64 MBytes of system memory with 32 MBytes assigned as physical object heap, some exemplary values are as follows:

Physical object heap Starting Address (PHSA): 32 MByte

Physical object heap Ending Address (PHEA): (64 MByte)-1

Virtual object heap Starting Address (VHSA): 32 MByte

Virtual object heap Ending Address (VHEA): (128 MByte)-1

Physical object heap 32 is composed of m dynamic random-access memory (DRAM) rows with each DRAM row containing n object allocation units. A 32-MByte physical object heap, for example, may include four banks of 2048 DRAM rows with each DRAM row containing 128 object allocation units, and each object allocation unit containing 32 bytes (i.e., 4* 2048*128*32=32 MBbytes total). Each DRAM row also has a portion of object directory 23 associated with each DRAM row. There is a one-to-one correspondence between an object allocation unit and an entry within object directory 23.

As shown in FIG. 4, a virtual address (VA) 40 is subdivided into the following fields: a VA-Hi field 41, a bank select (BS) field 42, a row address select (RAS) field 43, and a byte field 44. Preferably, VA-Hi field 41 is bits 1–13 of VA 40; BS field 42 is bits 14–15 of VA 40; RAS field 43 is bits 16–26 of VA 40; byte field 44 is bits 27–31 of VA 40. Note that bit 0 of VA 40 is not utilized. If the virtual address is greater than (or equal to) VHSA 45 and less than (or equal to) VHEA 46, then object translation will be enabled. During object translation, BS field 42 and RAS field 43 of virtual address 40 are utilized to read out: (1) a DRAM row, containing 128 object allocation units, from physical object heap 32, and (2) a corresponding 128 entries from object directory 23.

Furthermore, the high-order bits of virtual address 40 (i.e., VA-Hi field 41) are compared against all 128 object directory entries. If there is an object directory "hit," there is an existing translation for this virtual address. The (encoded) Column Address Select (CAS) bits 47 are set to indicate the number (0–127) of the matching object directory entry. These CAS bits 47 are then sent to the Column Select logic 48 within physical object heap 32 for reading out (on a load request), or storing into (on a store request), the corresponding object allocation unit. If there is an object directory "miss," then there is no existing translation for this virtual address. With an object directory "miss," object directory 23 is designed to set CAS bits 47 equal to the number of lowest numbered object directory entry which is not valid (this is referred to as a replacement set 49). The object translation unit subsequently writes a new entry in object directory 23 utilizing VA-Hi field 41, BS field 42 and RAS field 43 from virtual address 40 and replacement set 49 previously returned by object directory 23 on a "miss." The data in the corresponding object allocation unit in physical object heap 32 is zeroed.

Also note that, in the preferred embodiment, the garbage collection controller decides which virtual addresses will be allocated next, creates corresponding new entries in object directory 23, and zeros the corresponding object allocation units in physical object heap 32, before the Java Virtual Machine actually allocates any new objects. Therefore, accesses to the virtual object heap by Java applications and by the Java Virtual Machine do not normally encounter an object directory "miss."

The garbage collection controller also informs the Java virtual machine which virtual addresses are available for allocation through one or more sets of memory-mapped registers. When a new Java object is first allocated, the Java virtual machine must read the memory-mapped registers in order to determine the range(s) of virtual addresses to be assigned to this Java object. New Java objects can be allocated contiguously within the same range of virtual addresses until the range of virtual addresses is exhausted at which time another set of memory-mapped registers must be read from the garbage collection controller.

Also shown in FIG. 4 is a preferred embodiment of an entry within object directory 23. Object directory entry 50 includes a valid field 51, a Va-Hi field 52, a forward field 53, and a mark bit field 54. Valid field 51 indicates whether or not an object allocation unit is still valid. Va-Hi field 52 indicates high order bits of a Java object's virtual address. Forward field 53 is utilized for compaction purpose, if necessary. Finally, mark bit field 54 is for indicating an active object allocation unit.

As has been described, the present invention provides an improved method and apparatus for assisting garbage collection process within a Java virtual machine. A virtual object heap is provided along with a physical object heap. An Object Translation unit is utilized to map each allocated object within the virtual object heap into any available location within the physical object heap within a system memory. In addition, an object directory cache may be utilized to hide the object directory lookup under the DRAM RAS access such that any access latency penalty associated with object translation may be eliminated or at least minimized. Furthermore, the algorithms for object translations and the object directory as described have low overheads both in terms of latency added to requests to the system memory and in terms of number of bits per object required to map objects into the system memory.

While the invention has been particularly shown and described with reference to a preferred embodiment, it will be understood by those skilled in the art that various changes in form and detail may be made therein without departing from the spirit and scope of the invention.

What is claimed is:

1. A method for assisting garbage collection process within a data-processing system, said method comprising the steps of:

providing a virtual object heap and a physical object heap, wherein said virtual object heap is larger than said physical object heap;

allocating objects within said virtual object heap;

translating an address of one of said allocated objects within said virtual object heap into an address of a location within said physical object heap; and performing garbage collection in said virtual object heap only when a total number of objects within said virtual object heap has reached a threshold.

2. The method according to claim 1, wherein said data-processing system is a Java virtual machine and said objects are Java objects.

3. The method according to claim 1, wherein said method further includes a step of separately dividing said virtual object heap and said physical object heap into a plurality of object allocations units.

4. An apparatus for assisting garbage collection process within a data-processing system, comprising:

a virtual object heap and a physical object heap, wherein said virtual object heap is larger than said physical object heap;

means for allocating objects within said virtual object heap;

an object translation unit for translating an address of one of said allocated objects within said virtual object heap into an address of a location within said physical object heap, wherein said object translation unit is coupled between said virtual object heap and said physical object heap; and means for performing garbage collection in said virtual object heap only when a total number of objects within said virtual object heap has reached a threshold.

5. The apparatus according to claim 4, wherein said data-processing system is a Java virtual machine and said objects are Java objects.

6. The apparatus according to claim 4, wherein said virtual object heap and said physical object heap are separated divided into a plurality of object allocations units.

* * * * *